(12) United States Patent
Kim et al.

(10) Patent No.: US 11,075,369 B2
(45) Date of Patent: Jul. 27, 2021

(54) NEGATIVE ELECTRODE ACTIVE MATERIAL FOR LITHIUM SECONDARY BATTERY AND METHOD OF PREPARING THE SAME

(71) Applicant: LG CHEM, LTD., Seoul (KR)

(72) Inventors: Hyun Chul Kim, Daejeon (KR); Yong Ju Lee, Daejeon (KR); Eun Kyung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 163 days.

(21) Appl. No.: 15/576,992

(22) PCT Filed: Sep. 23, 2016

(86) PCT No.: PCT/KR2016/010678
§ 371 (c)(1),
(2) Date: Nov. 27, 2017

(87) PCT Pub. No.: WO2017/052278
PCT Pub. Date: Mar. 30, 2017

(65) Prior Publication Data
US 2018/0151868 A1    May 31, 2018

(30) Foreign Application Priority Data
Sep. 24, 2015    (KR) .................. 10-2015-0135473

(51) Int. Cl.
*H01M 4/134*    (2010.01)
*H01M 4/62*    (2006.01)
(Continued)

(52) U.S. Cl.
CPC ........... *H01M 4/134* (2013.01); *C01B 33/023* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS 8,999,583 B2    4/2015  Hirose et al.
10,084,183 B2   9/2018  Park et al.
(Continued)

FOREIGN PATENT DOCUMENTS

CN    102110853 A    6/2011
CN    103531760 A    1/2014
(Continued)

OTHER PUBLICATIONS

European Search Report for Appl. No. 16849003.5 dated Aug. 27, 2018.
(Continued)

*Primary Examiner* — Alix E Eggerding
(74) *Attorney, Agent, or Firm* — Birch, Stewart, Kolasch & Birch, LLP

(57) ABSTRACT

The present specification relates to a negative electrode active material including an amorphous silicon-based composite represented by $SiO_a$ (0<a<1); and a carbon coating layer distributed on a surface of the silicon-based composite, and provides a negative electrode active material in which the crystal growth of crystalline silicon in a silicon-based composite prepared by thermal reduction with a metal reducing agent is suppressed in a state where a carbon coating layer is formed, and the ratio of silicon in the composite is high, and a method of preparing the same.

8 Claims, 3 Drawing Sheets

(51) Int. Cl.

| | | |
|---|---|---|
| *H01M 4/48* | (2010.01) | |
| *H01M 4/38* | (2006.01) | |
| *H01M 4/36* | (2006.01) | |
| *C01B 33/023* | (2006.01) | |
| *H01M 10/052* | (2010.01) | |
| *H01M 4/583* | (2010.01) | |
| *H01M 10/0525* | (2010.01) | |
| *H01M 4/02* | (2006.01) | |

(52) U.S. Cl.
CPC .............. *H01M 4/386* (2013.01); *H01M 4/48* (2013.01); *H01M 4/483* (2013.01); *H01M 4/583* (2013.01); *H01M 4/625* (2013.01); *H01M 10/052* (2013.01); *H01M 10/0525* (2013.01); *H01M 2004/027* (2013.01)

(56) References Cited

U.S. PATENT DOCUMENTS

| | | | |
|---|---|---|---|
| 10,355,272 B2 | 7/2019 | Kim et al. | |
| 2003/0215711 A1* | 11/2003 | Aramata | H01M 4/485 |
| | | | 429/218.1 |
| 2005/0233213 A1* | 10/2005 | Lee | H01M 4/13 |
| | | | 429/218.1 |
| 2008/0193831 A1 | 8/2008 | Mah et al. | |
| 2011/0159368 A1 | 6/2011 | Hirose et al. | |
| 2013/0136988 A1 | 5/2013 | Tanaka et al. | |
| 2013/0280614 A1 | 10/2013 | Lee et al. | |
| 2014/0106231 A1 | 4/2014 | Park et al. | |
| 2014/0242455 A1 | 8/2014 | Ryu et al. | |
| 2014/0308585 A1 | 10/2014 | Han et al. | |
| 2015/0072220 A1* | 3/2015 | Kajita | H01M 4/386 |
| | | | 429/163 |
| 2015/0340687 A1* | 11/2015 | Put | H01M 4/364 |
| | | | 429/231.5 |
| 2016/0028085 A1 | 1/2016 | Kim et al. | |
| 2016/0079591 A1* | 3/2016 | Yang | H01M 10/0525 |
| | | | 429/231.8 |
| 2016/0260967 A1* | 9/2016 | Matus | H01M 4/0402 |
| 2016/0329562 A1* | 11/2016 | Akira | C09J 7/255 |

FOREIGN PATENT DOCUMENTS

| | | |
|---|---|---|
| CN | 103974905 A | 8/2014 |
| CN | 104813522 A | 7/2015 |
| KR | 10-2012-0139631 A | 12/2012 |
| KR | 10-1280546 B1 | 7/2013 |
| KR | 10-2013-0118191 A | 10/2013 |
| KR | 10-1345708 B1 | 12/2013 |
| KR | 10-2014-0048822 A | 4/2014 |
| KR | 10-2015-0050504 A | 5/2015 |
| WO | WO 2015/098024 A1 | 7/2015 |

OTHER PUBLICATIONS

Hu, Y.S., et al, "Superior Storage Performace of a Si@SiOx/C Nanocomposite as Anode Material for Lithium-Ion Batteries," Angew. Chem. Int. Ed., 2008, vol. 47, pp. 1645-1649.

International Search Report (PCT/ISA/210) issued in PCT/KR2016/010678, dated Jan. 2, 2017.

Chinese Office Action issued in corresponding Chinese patent application 201680033946.5, dated Mar. 24, 2020, with an English translation.

* cited by examiner

NEGATIVE ELECTRODE ACTIVE MATERIAL FOR LITHIUM SECONDARY BATTERY AND METHOD OF PREPARING THE SAME

CROSS-REFERENCE TO RELATED APPLICATION

This application claims priority to and the benefit of Korean Patent Application No. 10-2015-0135473 filed on Sep. 24, 2015, the disclosure of which is incorporated herein by reference in their entirety.

TECHNICAL FIELD

The present specification relates to a negative electrode active material for a lithium secondary battery which includes a silicon-based composite, and a method of preparing the same.

BACKGROUND ART

Lithium secondary batteries, which have been recently spotlighted as a power source of portable and small electronic devices, may exhibit high discharge voltages that are two times or more than those of batteries using a typical alkaline aqueous solution by using an organic electrolyte solution, and thus exhibit high energy density.

Oxides, formed of lithium and a transition metal, which have a structure capable of intercalating lithium such as $LiCoO_2$, $LiMn_2O_4$, $LiNi_{1-x}Co_xO_2$ ($0<x<1$) and the like have been mainly used as a positive electrode active material of a lithium secondary battery, and various types of carbon-based materials including artificial graphite, natural graphite, and hard carbon, which are capable of intercalating and deintercalating lithium, have been used as a negative electrode active material.

Graphite is mainly used as a negative electrode material of the lithium secondary battery. However, graphite has a low capacity per unit mass of 372 mAh/g and it may be difficult to prepare a high-capacity lithium secondary battery using graphite.

As a negative electrode material exhibiting a higher capacity than graphite, a material forming an intermetallic compound with lithium, such as silicon, tin, and an oxide thereof, is promising. However, there is a problem in that volumes of the above-described materials expand because crystal structures thereof are changed when absorbing and storing lithium. When silicon absorbs and stores the maximum amount of lithium, the silicon is transformed into $Li_{4.4}Si$ and the volume thereof expands due to charging. In this case, as a rate of increase in volume by charging, the volume may expand up to about 4.12 times the volume of the silicon before the volume expansion.

Therefore, many studies on an increase in the capacity of a negative electrode material such as silicon have been conducted. However, since a metal such as silicon (Si), tin (Sn), aluminum (Al) or the like is reacted with lithium during charging and discharging, volume expansion and contraction occur, and thus cycle characteristics of the battery are degraded.

When a non-carbon-based material such as SiO, obtained by allowing Si or $SiO_2$ to have nanodomains, is used, higher capacity characteristics than those of a carbon-based material may be obtained and volume expansion may be suppressed in comparison to Si, and thus a considerable amount of research on the non-carbon-based material has been conducted. However, since a reaction between lithium (Li) and oxygen (O) forming by-products exhibits an irreversible reaction, initial efficiency may be reduced.

DISCLOSURE

Technical Problem

The present specification has been made in view of the above, and an object of the present specification is to provide a negative electrode active material for a lithium secondary battery capable of improving the initial efficiency and lifetime characteristics of the lithium secondary battery, and a preparation method thereof, and specifically, to provide a negative electrode active material including a silicon-based composite in consideration of both volume expansion and the capacity improvement.

Technical Solution

In order to accomplish the object, an embodiment of the present specification provides a negative electrode active material which includes a silicon-based composite represented by $SiO_a$ ($0<a<1$) and including amorphous silicon, and a carbon coating layer distributed on a surface of the silicon-based composite.

According to another embodiment of the present specification, the silicon-based composite may further include crystalline silicon having a crystal size of 10 nm or less.

According to still another embodiment of the present specification, an amount of the amorphous silicon in the silicon-based composite may be 90 wt % or more based on the total weight of silicon.

According to yet another embodiment of the present specification, a thickness of the carbon coating layer may be in a range of 0.003 to 3.0 μm.

According to yet another embodiment of the present specification, an average particle diameter of the negative electrode active material may be in a range of 0.1 to 20 μm.

According to yet another embodiment of the present specification, an average particle diameter of the negative electrode active material may be in a range of 0.5 to 10 μm.

In order to accomplish the object, an embodiment of the present specification provides a method of preparing a negative electrode active material, which includes: forming a carbon coating layer on a silicon-based precursor represented by $SiO_x$ ($0<x<2$); thermally treating the silicon-based precursor on which the carbon coating layer is formed; and preparing a silicon-based composite represented by $SiO_a$ ($0<a<1$) and having a surface on which a carbon coating layer is distributed by removing impurities, wherein the silicon-based composite includes amorphous silicon.

According to yet another embodiment of the present specification, the silicon-based composite may further include crystalline silicon having a crystal size of 10 nm or less.

According to yet another embodiment of the present specification, the carbon coating layer may include one or more selected from the group consisting of natural graphite, artificial graphite, mesocarbon microbeads (MCMB), carbon fibers and carbon black.

According to yet another embodiment of the present specification, a content of the carbon coating layer may be in a range of 1 to 50 wt % of a total weight of the negative electrode active material.

According to yet another embodiment of the present specification, the thermal treatment may include thermally reducing a silicon-based precursor with a metal reducing agent in an inert atmosphere.

According to yet another embodiment of the present specification, the thermal treatment may be performed in a temperature range of 350 to 650° C.

According to yet another embodiment of the present specification, the thermal treatment may be performed in a rotary kiln.

According to yet another embodiment of the present specification, the metal reducing agent may include one selected from the group consisting of Ti, Al, Mg, Ca, Be, Sr, Ba and a combination thereof.

According to yet another embodiment of the present specification, a molar ratio of the silicon-based precursor to the metal reducing agent may be in a range of 1:0.001 to 1:1.

According to yet another embodiment of the present specification, the preparing the silicon-based composite may include removing impurities using an acidic aqueous solution.

According to yet another embodiment of the present specification, the acidic aqueous solution may include one or more selected from the group consisting of hydrochloric acid, nitric acid and sulfuric acid.

According to yet another embodiment of the present specification, the impurities may include one or more materials selected from the group consisting of a metal oxide, a metal silicide and a metal silicate, and the metal may be one selected from the group consisting of Ti, Al, Mg, Ca, Be, Sr, Ba and a combination thereof.

In order to accomplish the object, an embodiment of the present specification provides a negative electrode for a lithium secondary battery including the above-described negative electrode active material.

In order to accomplish the object, an embodiment of the present specification provides a lithium secondary battery including the above-described negative electrode.

Advantageous Effects

A negative electrode active material according to the present specification includes an amorphous silicon-based composite or a crystalline silicon-based composite with a small crystal size, and thus, when the negative electrode active material is applied to a lithium secondary battery, initial capacity and efficiency can be improved.

Further, according to the negative electrode active material of the present specification, since a silicon-based precursor is reduced after the carbon coating layer is formed, the crystal growth of silicon can be easily controlled, a reducing agent is prevented from reacting only on a surface of the silicon-based precursor such that the inside thereof can be uniformly reduced, and an oxygen content in the silicon-based composite can be easily controlled, and thus lifetime characteristics of a secondary battery are improved due to improvement of swelling properties, and initial capacity and efficiency can be enhanced due to a decrease in the oxygen content.

BEST MODE FOR CARRYING OUT THE INVENTION

Examples

Figure 1:
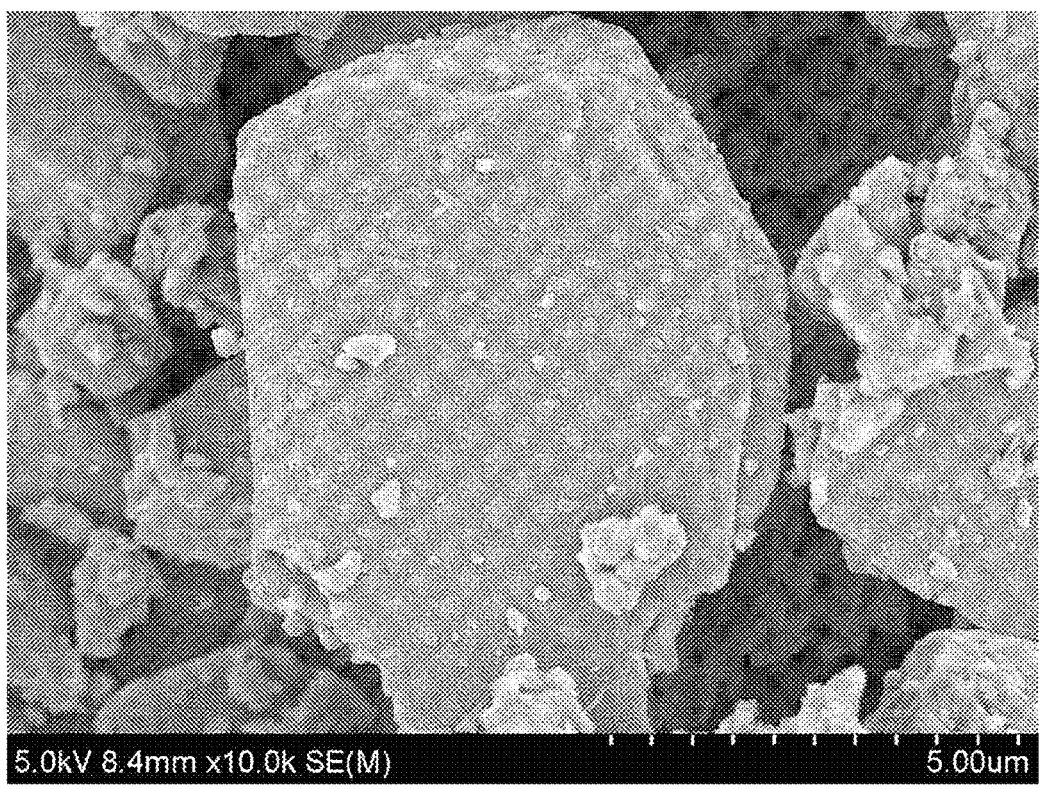
FIG. 1 is a scanning electron microscope (SEM) image of a surface of a silicon-based composite of Example 1 according to the present specification.

Hereinafter, the present specification will be described in more detail. However, the following examples are merely provided to allow for a clearer understanding of the present specification, rather than to limit the scope thereof.

Example 1

1. Preparation of SiO Having Carbon Coating Layer Formed Thereon 100 g of $SiO_x$ (x=1) powder was introduced into a rotary kiln, argon gas was flowed thereinto at a rate of 0.5 L/min and a temperature was raised up to 1000° C. at a rate of 5° C./min. Thermal treatment was performed for 5 hours while rotating the rotary kiln at a rate of 30 rpm/min, flowing argon gas at a rate of 1.8 L/min and flowing acetylene gas at a rate of 0.5 L/min, and thereby $SiO_x$ (x=1) having a carbon coating layer formed thereon was prepared. Here, a carbon content of the carbon coating layer was 10 wt % based on $SiO_x$ (x=1).

2. Preparation of Silicon-Based Composite 100 g of the prepared $SiO_x$ (x=1) having a carbon coating layer formed thereon and 41 g of Mg powder as a metal reducing agent were mixed, and then put in a reaction vessel of a thermal reduction chamber. Subsequently, the temperature of the chamber was increased to 600° C. Thereafter, Ar was used as an inert gas, and Ar was supplied at a flow rate of about 800 sccm. Further, the reaction was performed using a rotary kiln as the reaction vessel.

The thermal reduction reaction was performed for 12 hours, and the chamber temperature was decreased to room temperature after 12 hours. A product in the reaction vessel was collected to prepare a silicon-based composite. Reduced MgO or the like was removed from the prepared silicon-based composite using HCl (1N) to obtain a silicon-based composite only having crystals with a crystal size of 10 nm or less, and at this time, x of $SiO_x$ was reduced to about 0.6.

3. Preparation of Negative Electrode

The silicon-based composite with a carbon coating layer formed thereon prepared as above as a negative electrode active material, acetylene black as a conductive agent, and polyvinylidene fluoride as a binder were mixed at a weight ratio of 95:1:4 and the mixture was mixed with N-methyl-2-pyrrolidone as a solvent to prepare a slurry. One surface of a copper current collector was coated with the prepared slurry to have a thickness of 30 μm, dried, rolled and punched into a predetermined size to prepare a negative electrode.

4. Preparation of Lithium Secondary Battery

A coin-type half cell (2016 R-type half cell) was prepared using the negative electrode, a lithium counter electrode, a microporous polyethylene separator and an electrolyte in a helium-filled glove box. A solution prepared by dissolving 1

M $LiPF_6$ in a solvent in which ethylene carbonate and dimethyl carbonate were mixed in a volume ratio of 50:50 was used as the electrolyte.

Example 2

A secondary battery was prepared in the same manner as in Example 1 except that a silicon-based composite only including amorphous silicon was obtained by performing the thermal reduction at a temperature of 570° C., and a negative electrode was prepared using the silicon-based composite.

Comparative Example 1

1. Preparation of Silicon-Based Composite

A silicon-based composite was prepared in the same manner as in Example 1 except that no carbon coating layer was formed.

2. Preparation of Secondary Battery

A lithium secondary battery was prepared in the same manner as in Example 1 except that the silicon-based composite prepared as above was used as a negative electrode active material.

Comparative Example 2

1. Preparation of Silicon-Based Composite

A silicon-based composite was prepared in the same manner as in Example 1 except that a silicon-based composite was prepared by forming a carbon coating layer after reducing SiO.

2. Preparation of Secondary Battery

A lithium secondary battery was prepared in the same manner as in Example 1 except that the silicon-based composite prepared as above was used as a negative electrode active material.

Comparative Example 3

1. Preparation of Silicon-Based Composite

A silicon-based composite was prepared in the same manner as in Example 1 except that the temperature of the thermal reduction reaction was set to 750° C.

2. Preparation of Secondary Battery

A lithium secondary battery was prepared in the same manner as in Example 1 except that the silicon-based composite prepared as above was used as a negative electrode active material.

Experimental Example 1: Observation of Morphology

In order to determine the morphology of the surface and inside of the silicon-based composites prepared in Example 1 and Comparative Examples 1 and 2, the silicon-based composites were observed using a scanning electron microscope, and the results are shown in FIGS. 1 to 4.

Figure 2:
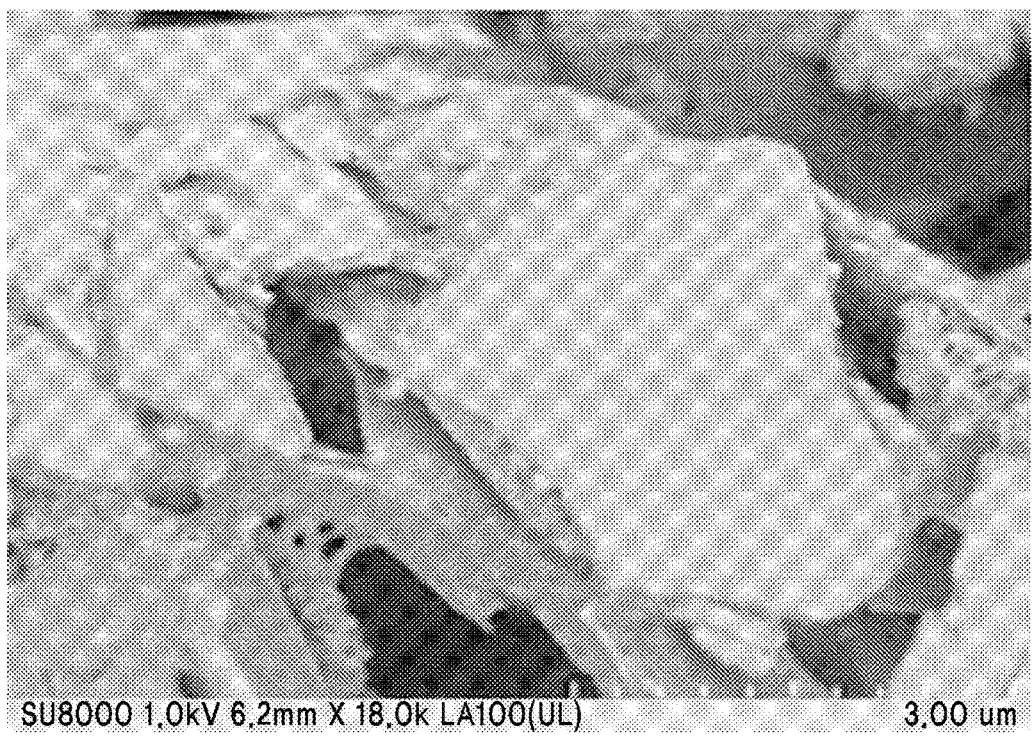
FIG. 2 is an SEM image of an internal cross-section of the silicon-based composite of Example 1 according to the present specification
Figure 3:
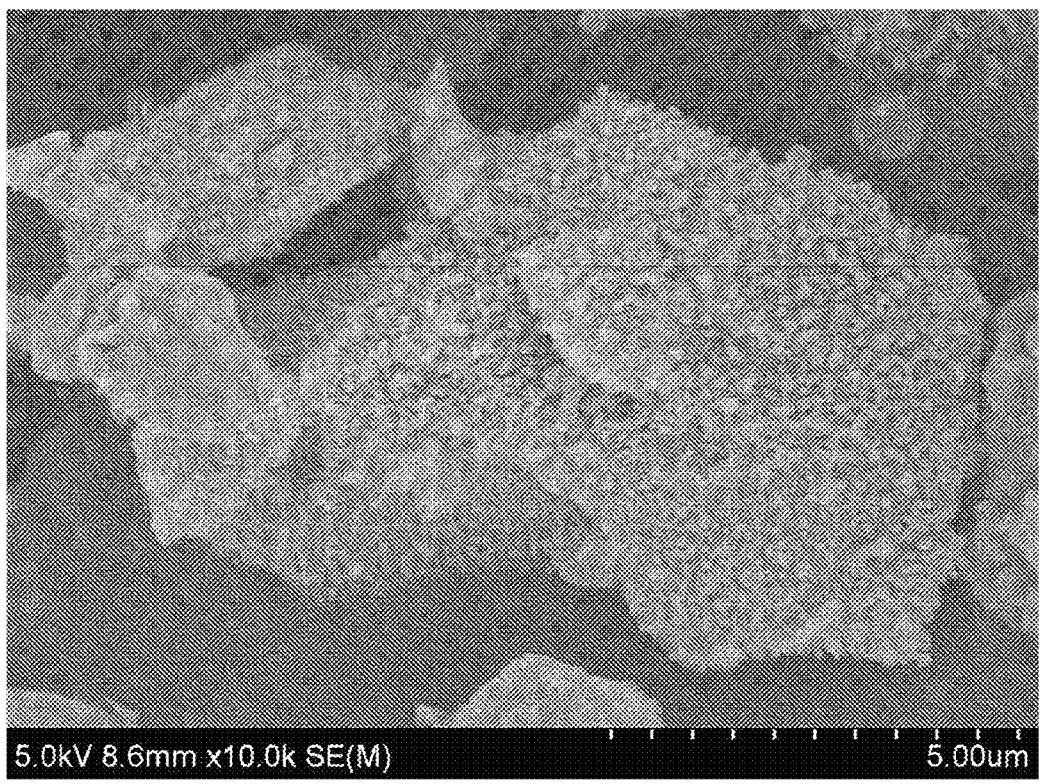
FIG. 3 is an SEM image of a surface of the silicon-based composite of Comparative Example 1.
Figure 4:
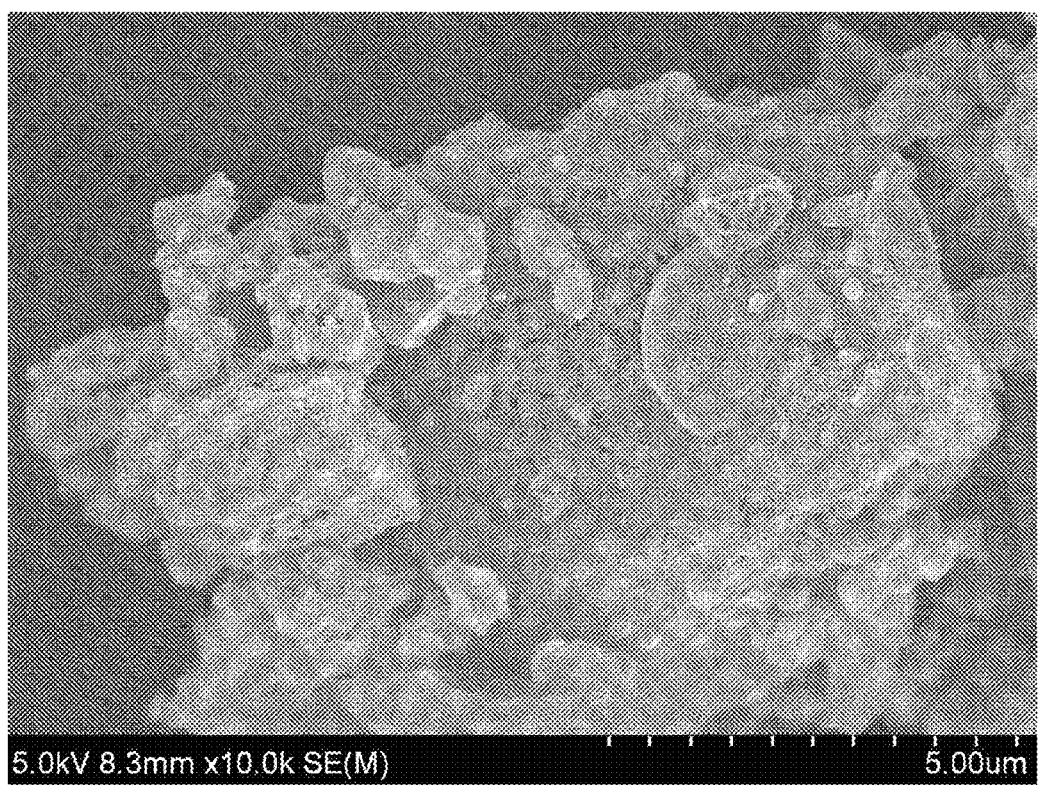
FIG. 4 is an SEM image of a surface of the silicon-based composite of Comparative Example 2.

Referring to FIGS. 1, 3 and 4 showing the surface of the silicon-based composites of Example 1 and Comparative Examples 1 and 2, it can be determined that the surface structure is very rough due to the absence of the carbon coating layer during reduction in the case of Comparative Examples 1 and 2 (FIGS. 3 and 4), but the outer surface has a fairly smooth shape in the case of Example 1 (FIG. 1) in which the reduction reaction was performed after the formation of the carbon coating layer. Further, referring to FIG. 2 showing the result of observing an inner structure of Example 2, it can be confirmed that the inner surface has a smooth shape similar to the shape of the outer surface.

Accordingly, it can be deduced that the reduction rapidly occurred only on the surface and crystal growth occurred, and thus a rough surface shape was formed due to residues after removal of a metal after reduction, and also, the inside was hardly reduced in the case of Comparative Examples 1 and 2 in which the reaction was performed without forming the carbon coating layer. That is, it can be seen from the comparison of FIG. 1 and FIGS. 3 and 4 that the silicon-based composite was not uniformly reduced as a whole due to the absence of the carbon coating layer during the reduction reaction, and it can be determined that the crystal growth of Si and metal oxides was suppressed and the outer and inner surfaces were uniformly reduced in the case of Example 1 of FIGS. 1 and 2. Further, it can be inferred that almost the same morphology as Example 1 is formed even in the case of Example 2 in which silicon is amorphous.

Experimental Example 2: Performance Evaluation of Secondary Battery

1. Measurement of Initial Discharge Capacity and Initial Efficiency

In order to determine initial discharge capacities of the coin-type half cells prepared in Examples 1 and 2 and Comparative Examples 1 and 2, the coin-type half cells were charged and discharged to 0.1 C at a voltage of 0 V to 1.5 V once, and initial discharge capacities, initial charge capacities and Coulombic efficiency were measured.

The measurement results of the initial discharge capacity, initial efficiency and lifetime characteristics measured by the above-described method are shown in the following Table 1.

2. Measurement of Lifetime Characteristics and Change in Thickness (Swelling)

After the initial charging and discharging were performed on the coin-type half cells prepared in Examples 1 and 2 and Comparative Examples 1 and 2, charging and discharging were carried out 49 times at a 0.5 C-rate in the same voltage range, the difference of the initial thickness and the final thickness after the last charging and discharging were measured and a thickness increase rate is shown in the following Table 1.

TABLE 1

|  | Crystal size of Si | Initial discharge capacity (mAh/g) | Initial efficiency (%) | Lifetime characteristics (%) | Swelling (%) |
| --- | --- | --- | --- | --- | --- |
| Example 1 | 10 | 2260 | 83 | 70 | 187 |
| Example 2 | — | 2258 | 83 | 70 | 180 |
| Comparative Example 1 | 45 | 2290 | 79 | 40 | 240 |
| Comparative Example 2 | 46 | 2255 | 83 | 50 | 230 |
| Comparative Example 3 | 34 | 2257 | 83 | 57 | 210 |

Initial efficiency (%): (Discharge capacity of first cycle/Charge capacity of first cycle) × 100
Lifetime characteristics: (Discharge capacity of $49_{th}$ cycle/Discharge capacity of first cycle) × 100
Swelling (%): {(Final thickness-initial thickness)/Initial thickness} × 100

As shown in Table 1, as a result of measuring and comparing the initial discharge capacity and swelling of Examples 1 and 2 and Comparative Examples 1 and 2, the initial efficiency of the secondary batteries of Examples 1 and 2 including the silicon-based composite having the carbon coating layer formed thereon increased by 4% and the lifetime characteristics thereof were improved by about 30% as compared to the secondary battery of Comparative Example 1 including the silicon-based composite on which the carbon coating layer was not formed. On the other hand, the swelling phenomenon was reduced by 50 to 60%, from which it can be determined that the safety of the battery is improved.

Further, as a result of comparing Examples 1 and 2 and Comparative Examples 1 and 2, the lifetime characteristics of the secondary battery of Examples 1 and 2 in which SiO was reduced after the formation of the carbon coating layer was increased by about 20%, and the swelling phenomenon was reduced by 40 to 50% as compared to the secondary battery of Comparative Example 2 in which the carbon coating layer was formed after the reduction of SiO, from which it can be determined that the safety of the battery is improved.

Further, in the case in which the reaction temperature cannot be controlled appropriately although the thermal reduction reaction is performed after the formation of the carbon coating layer as in Comparative Example 3, it can be determined that the crystal of silicon was grown to a large extent, and thus the swelling properties and the lifetime characteristics were remarkably lowered.

It can be seen that the efficiency of the battery is improved by being imparted with the conductivity of the silicon-based composite, which is imparted by the carbon coating layer as in Example 1. Further, in Example 1, it was confirmed from the fact that lifetime characteristics increased and swelling phenomenon decreased that the reduction rate can be controlled by reducing SiO after the formation of the carbon coating layer, and thus the inside of SiO can be uniformly reduced, and crystalline Si and crystalline $SiO_2$ can be easily controlled.

While the present specification has been particularly shown and described with reference to preferred embodiments thereof, it will be understood by those skilled in the art that various modifications and variations may be made therein without departing from the spirit and scope of the invention as defined by the appended claims. Thus, the invention is intended to cover all modifications, equivalents, and alternatives falling within the scope of the invention as defined by the appended claims.

[Modes of the Invention]

Hereinafter, preferred embodiments of the present specification will be described in detail with reference to the accompanying drawings. Prior to the description, it should be understood that the terms or words used in the specification and the appended claims should not be construed as limited to general and dictionary meanings, but should be interpreted based on the meanings and concepts corresponding to technical aspects of the present specification on the basis of the principle that the inventor is allowed to define terms appropriately for the best explanation. Therefore, the embodiments described in the specification and elements illustrated in the drawings are just a preferable example for the purpose of illustration only, not intended to limit the scope of the disclosure, so it should be understood that other equivalents and modifications could be made thereto at the time of filing the application.

An embodiment of the present specification provides a negative electrode active material which includes a silicon-based composite represented by $SiO_a$ (0<a<1), and a carbon coating layer distributed on a surface of the silicon-based composite.

Generally, in the silicon-based material, cracking of particles, chemical pulverization or the like easily occurs due to large changes in volume (swelling) during charge and discharge, and thus there is a problem in that lifetime characteristics rapidly decrease.

In order to address the above-described issue, instead of a silicon-based negative electrode active material including only silicon (Si), a silicon-based negative electrode active material has been developed in which Si and $SiO_2$ are present in a separated state in a particle. However, by-products such as $Li_2O$ are formed due to the reaction between amorphous $SiO_2$ and lithium included in an electrolyte, and thus the initial discharge capacity and initial efficiency are reduced due to the by-products.

Therefore, the development of a silicon-based negative active material having a low oxidation number, that is, a negative electrode active material represented by $SiO_m$ (m<1) has been made. As currently known, a method of preparing $SiO_m$ by further adding Si in the synthesis process is used, but this method has a problem in that Si crystals grow to a large extent such that lifetime characteristics are eventually deteriorated, and the manufacturing cost is greatly increased due to the synthesis.

The negative electrode active material according to the present specification may include a carbon coating layer distributed on a surface of the silicon-based composite. When such a carbon coating layer is formed, the reaction rate can be controlled and the reducing agent can be prevented from reacting only on the surface of the crystalline silicon oxide during reduction of a silicon-based precursor ($SiO_x$). Accordingly, the inside of the crystalline silicon oxide can be uniformly reduced, and the ratio of the crystalline silicon and the crystalline silicon oxide can be easily controlled.

The negative electrode active material according to the present specification includes a silicon-based composite and a carbon coating layer, silicon of the silicon-based composite may be amorphous, and the carbon coating layer may be in the form of a layer formed to surround the surface of the silicon-based composite.

When the silicon-based composite is used as a negative electrode active material, the silicon included in the silicon-based composite may substantially cause an electrochemical reaction when lithium ions deintercalated from a positive electrode active material are absorbed, stored and released. The crystalline characteristic of the silicon may be amorphous or crystalline, and this is because, when the crystalline silicon oxide is reduced by thermal reduction using a metallic gas to be described below, the reduced silicon may be reduced to crystalline silicon or may be reduced to amorphous silicon. However, in the case of the silicon-based composite included in the negative electrode active material according to the present specification, mainly amorphous silicon may be present, and ideally, only amorphous silicon may be present, and only amorphous silicon may be controlled to be present by controlling the temperature of the heat treatment and reduction.

In some cases, the silicon-based composite may further include crystalline silicon, and in this case, the crystal size may be 10 nm or less. Here, the crystal size may be determined by X-ray diffraction (XRD) analysis or electron microscopy (SEM and TEM). Although to be described below, the reason why the crystalline size of the crystalline silicon may be in the above-described range is that the thermal reduction can be performed even at a low temperature, and uniform reduction of the silicon-based composite as a whole can be achieved by forming the carbon coating layer even when a metal reducing agent having a strong reducing property is used, and the growth of silicon can be properly controlled.

When the crystalline silicon is included in the silicon-based composite, an amount of the crystalline silicon may be controlled to about 10 wt % or less, and preferably to 5 wt % or less based on the total weight of silicon in the silicon-based composite. Although it may be preferable to include only amorphous silicon, such control is not performed flawlessly at the time of actual production, and thus even though crystalline silicon is included, the amount thereof may be controlled to 10 wt % or less, the size of the crystal grains may be controlled to 10 nm or less, and thereby the desired result may be achieved.

The negative electrode active material according to the present specification may further include a crystalline silicon oxide in the silicon-based composite. Since the silicon-based composite is a composite formed of silicon and a silicon oxide, a silicon oxide may be further included. However, when an amorphous silicon oxide among the silicon oxides is not included, the reaction between the amorphous silicon oxide and lithium contained in an electrolyte can be eliminated, and the crystal growth of the crystalline silicon can be suitably suppressed to prevent a volume expansion problem.

The silicon-based composite may be represented by $SiO_a$ ($0<a<1$). In the silicon-based composite, the ratio of silicon and silicon oxide contained therein may be expressed as $1-(a/2):(a/2)$, a is the number ratio of oxygen (O) atoms to silicon (Si) atoms contained in the silicon-based composite, and $0<a<1$.

Specifically, when a is 1 or more, the proportion of silicon oxide is higher than that of silicon as compared to the case in which a is less than 1, and the swelling phenomenon of the negative electrode active material may be lowered to a certain extent, but the initial discharge capacity of the lithium secondary battery may be reduced, resulting in an active material deviating from the desired negative electrode active material in the present specification. When a is in the range of 0 to 1 due to a low content of oxygen, a negative electrode active material optimized both in terms of swelling, that is, a problem of volume expansion, and securement of the initial discharge capacity can be provided.

When the silicon-based composite is prepared in a state where a carbon coating layer is formed on the surface thereof, the initial efficiency, lifetime characteristics and battery capacity characteristics of the secondary battery including the silicon-based composite can be improved due to electrical conductivity imparted to the silicon-based composite by the carbon coating layer.

The thickness of the carbon coating layer may be in the range of 0.003 μm to 3.0 μm. When the thickness of the carbon coating layer is less than 0.003 μm, a carbon coating layer is too thin to contribute greatly to improvement of electrical conductivity, and the role of suppression of crystal growth may not be effectively performed during reduction of the silicon-based composite. When the thickness of the carbon coating layer is more than 3.0 μm, the size of the negative electrode active material may become excessively large due to an excessively thick carbon coating layer, the absorption, storing and release of lithium ions may be inhibited, and capacity and initial efficiency may be rather reduced.

An average particle diameter of the negative electrode active material including a carbon coating layer formed therein according to an embodiment of the present specification may be in the range of 0.1 to 20 μm, and preferably in the range of 0.5 to 10 μm. When the particle diameter of the negative electrode active material is less than 0.1 μm, an electrode density may be reduced. When the particle diameter of the negative electrode active material is more than 20 μm, rate-determining characteristics may be lowered, or lifetime characteristics may be reduced due to volume expansion.

Further, silicon particles used as a negative electrode active material generally involve a very complicated crystal change in the reaction of electrochemical absorption, storing and release of lithium atoms. As the reaction of electrochemical absorption, storing and release of lithium atoms proceeds, the composition and crystal structure of silicon particles are changed to Si (crystal structure: Fd3m), LiSi (crystal structure: I41/a), $Li_2Si$ (crystal structure: C2/m), $Li_7Si_2$ (Pbam), $Li_{22}Si_5$ (F23), etc. Further, the volume of the silicon particles expands by about four times as the complex crystal structure changes, and the reaction between the silicon-based composite according to an embodiment of the present specification and lithium atoms has an advantage in that the reaction can proceed while maintaining the crystal structure of the silicon-based composite. Another embodiment of the present specification provides a method of preparing the above-described negative electrode active material.

The method of preparing a negative electrode active material includes forming a carbon coating layer on a silicon-based precursor represented by $SiO_x$ ($0<x<2$); thermally treating the silicon-based precursor on which the carbon coating layer is formed; and preparing a silicon-based composite represented by $SiO_a$ ($0<a<1$) and having a surface on which a carbon coating layer is distributed by removing impurities, wherein the silicon-based composite includes amorphous silicon.

According to an embodiment of the present specification, the formation of a carbon coating layer on a silicon-based precursor may be the formation of a coating layer by covering a surface of the silicon-based precursor with a carbon-based material before the silicon-based precursor which is a raw material is reduced.

The silicon-based precursor represented by $SiO_x$ ($0<x<2$), which is a raw material, may include a material in which crystalline silicon and a crystalline silicon oxide form a composite as described above, and a material in which the two materials are mixed may be applied as a raw material.

Further, a carbon coating layer formed on a surface of the silicon-based precursor as a coating layer may include, for example, graphite such as natural graphite and artificial graphite, carbon fibers such as mesocarbon microbeads (MCMB), carbon nanotubes and carbon nanofibers, carbon black such as Ketjen black, Denka black and acetylene black, or a mixture thereof, and any carbon source enabling carbon coating on the surface of the silicon-based precursor may be applied without particular limitation.

The formation of the carbon coating layer as described above may be performed by dispersing the carbon precursor in a solvent such as tetrahydrofuran (THF), an alcohol or the like, and adding a mixture thus obtained to the silicon-based precursor, followed by drying and thermal treatment, and may be performed by supplying acetylene gas, but any carbon-coating method typically used in the related field may be used without particular limitation.

The content of the carbon coating layer may be in the range of 1 to 50 wt % of the total weight of the negative electrode active material. When the carbon coating layer is applied in an amount of less than 1 wt %, a uniform coating layer may not be formed and conductivity may be deteriorated. When the carbon coating layer is applied in an amount of more than 50 wt %, a coating layer becomes too thick, the size of the negative electrode active material may become too large, and the capacity and initial efficiency may be rather reduced. When the coating amount is appropriately controlled, as described above, the silicon-based composite is suitably imparted with electrical conductivity, and thereby the initial efficiency, lifetime characteristics, and battery capacity characteristics of the secondary battery including the silicon-based composite can be improved.

In the method of preparing a negative electrode active material according to an embodiment of the present specification, the reaction rate may be controlled because the silicon-based precursor is reduced after the carbon coating layer is formed, and a reducing agent may be prevented from reacting only on a surface of the silicon-based precursor. Accordingly, the inside of the silicon-based precursor can be uniformly reduced, the oxygen content in the silicon-based composite produced can be easily controlled, and the carbon coating layer as a barrier layer can also serve to control the crystal growth of silicon.

According to an embodiment of the present specification, the step of thermal treatment may be a step of reducing the silicon-based precursor having a surface coated with the carbon coating layer by heating under specific conditions, and specifically, the step of thermal treatment may include a step of thermally reducing the silicon-based precursor using a metal reducing agent under an inert atmosphere.

The thermal reduction of the silicon-based precursor may be performed by a process of thermally reducing the silicon-based precursor using a metallic powder or a metallic gas containing a metal reducing agent in an inert atmosphere. Oxygen is locally released in the form of a metal oxide by the metal in the silicon-based precursor by the thermal reduction, and thereby local reduction occurs.

That is, the content of oxygen decreases as the silicon-based precursor is reduced, and a silicon-based composite in which silicon, mainly silicon, silicon oxide remaining unreduced, and silicon oxide produced by reoxidation are mixed with each other can be produced as a result. As described above, the silicon produced may include crystalline silicon, may be mostly amorphous silicon, or a mixture thereof, but may be ideally amorphous silicon. Further, the remaining silicon oxide may be crystalline.

For example, Ti, Al, Mg, Ca, Be, Sr, Ba or a combination thereof may be applied as the metal reducing agent, and thermal reduction may be performed using powders or gases of the above-described metals. Any type of a metal reducing agent may be used without limitation as long as it has sufficient reducing power to separate or extract oxygen from the above-described silicon-based precursor, and preferably, magnesium (Mg) may be used.

Further, the thermal treatment may be performed in a temperature range of 350 to 650° C., and preferably in a temperature range of 500 to 600° C. When the temperature of the thermal treatment is less than 350° C., it may be difficult for the reduction reaction to occur due to a low temperature. When the temperature of the thermal treatment is more than 650° C., the crystal of silicon may grow large, and the crystal characteristic may be degraded.

When the thermal reduction is carried out by performing the thermal treatment at a low temperature in the range of 350 to 650° C., the crystal growth of silicon can be prevented to some extent due to a low temperature, the amount of oxygen in the silicon-based composite prepared can be easily controlled by performing the thermal reduction reaction using a metal reducing agent having a strong reducing power at low temperature, and finally, a silicon-based composite having a high silicon ratio, that is, $SiO_a$ (0<a<1) can be prepared, and amorphous silicon which has no crystals can be eventually prepared through temperature control.

Further, the thermal reduction may be performed while flowing an inert gas, and examples of the inert gas which may be used herein include, for example, Ar, $N_2$, Ne, He, Kr, or a mixed gas thereof.

The step of thermal treatment may include performing a reaction of a mixture obtained by mixing a metallic powder or a metallic gas containing a metal reducing agent such as magnesium with the silicon-based precursor in a reaction furnace. For example, the reaction may be performed in a rotary kiln to maintain a uniform reaction by maximizing a contact area between the silicon-based precursor and Mg which is a metal reducing agent.

In the method of preparing a negative electrode active material according to the present specification, the amount of oxygen in the finally prepared silicon-based composite may be controlled by adjusting the ratio of the silicon-based precursor and the metal reducing agent in the step of thermal treatment. In order to control the amount of oxygen in the silicon-based composite, a molar ratio of the silicon-based precursor to a metal reducing agent may be in the range of 1:0.001 to 1:1.

As the amount of the metal reducing agent becomes larger, a larger amount of the silicon-based precursor may be reduced, and thus the ratio of silicon and silicon oxide contained in the prepared silicon-based composite can be easily controlled by controlling the amount of the metal reducing agent used in the thermal reduction, and the ratio of silicon in the silicon-based composite may be further increased.

As described above, when the content of oxygen is decreased and the range of a is less than 1 in $SiO_a$ which is a silicon-based composite, the initial capacity can be increased and the efficiency can also be improved. Further, when the reduction reaction is carried out in a state where the carbon coating layer is formed, the crystal size of the crystalline material in the $SiO_a$ can be easily controlled, and the inside thereof can be uniformly reduced.

As an example, Mg may be included as the metal reducing agent. Accordingly, a stoichiometric reaction of the silicon-based precursor and Mg as the reducing agent is as follows:

$$2Mg+SiO_2 \rightarrow Si+2MgO$$ [Reaction Formula 1]

That is, as shown in Reaction Formula 1, the metal, as a reducing agent, reduces silicon oxide, whereby the metal may be oxidized to produce a metal oxide, and the silicon oxide may be reduced to produce silicon. In addition, a metallic reducing agent other than Mg may be used as the reducing agent, and in this case, the reduction of the silicon-based precursor occurs by a reaction similar to the above reaction formula.

According to an embodiment of the present specification, the preparing of the silicon-based composite may include removing impurities using an acidic aqueous solution.

As the acidic aqueous solution, for example, hydrochloric acid, nitric acid, sulfuric acid and the like may be used, and preferably, an aqueous hydrochloric acid solution may be used and may be used at a concentration in the range of about 0.1 to 10 N. When hydrochloric acid is used at a concentration of less than 0.1 N, impurities may not be completely removed. When hydrochloric acid is used at a concentration of more than 10 N, preparation efficiency may be lowered. Examples of the removed impurities include MgO, $Mg_2Si$, $Mg_2SiO_4$, etc., and the impurities may vary depending on the type of metal used as a metal reducing agent.

After impurities including metal oxides are removed from the silicon-based composite, a silicon-based composite including amorphous silicon, crystalline silicon and a crystalline silicon oxide may be obtained after undergoing general cleaning and drying processes.

As described above, the silicon-based composite prepared by reducing SiO may include crystalline silicon, amorphous silicon and a crystalline silicon oxide. The negative electrode active material including the silicon-based composite can allow the reaction between the amorphous silicon oxide and lithium contained in the electrolyte to be excluded, and improve the initial efficiency and capacity characteristics of the secondary battery.

Still another embodiment of the present specification provides a lithium secondary battery including the negative electrode active material prepared by the method of preparing the negative electrode active material.

The lithium secondary battery includes a positive electrode including a positive electrode active material; a separator; a negative electrode including the negative electrode active material; and an electrolyte, and the negative electrode may be prepared with the negative electrode active material. For example, the negative electrode active material according to an embodiment of the present specification is mixed with a binder, a solvent, and a conductive agent and a dispersant as necessary, and stirred to prepare a slurry. Then, a current collector may be coated with the slurry and pressed to prepare the negative electrode.

Examples of the binder include a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, styrene-butadiene rubber (SBR), fluoro rubber, various copolymers, etc.

Examples of the solvent include N-methyl-2-pyrrolidone, acetone, water and the like.

The conductive agent is not particularly limited as long as it has conductivity and does not generate chemical changes in the battery. Examples thereof include graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; a conductive metal oxide such as titanium oxide; a conductive material such as a polyphenylene derivative, etc.

An aqueous-based dispersant or an organic dispersant such as N-methyl-2-pyrrolidone may be used as the dispersant.

As in the preparation of the negative electrode, a positive electrode active material, a conductive agent, a binder, and a solvent are mixed to prepare a slurry, and then a positive electrode may be prepared by directly coating a metal current collector with the slurry or by casting the slurry on a separate support and laminating a positive electrode active material film separated from the support on a metal current collector.

Examples of the positive electrode active material may be a layered compound, such as lithium cobalt oxide ($LiCoO_2$) or lithium nickel oxide ($LiNiO_2$), or a compound substituted with at least one transition metal; lithium manganese oxides represented by the chemical formula $Li_{1+y}Mn_{2-y}O_4$ (where y is in the range of 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide represented by the chemical formula of $LiNi_{1-y}M_yO_2$ (where M is cobalt (Co), manganese (Mn), aluminum (Al), copper (Cu), iron (Fe), magnesium (Mg), boron (B), or gallium (Ga), and y is in the range of 0.01 to 0.3); a lithium manganese composite oxide represented by the chemical formula of $LiMn_{2-y}M_yO_2$ (where M is cobalt (Co), nickel (Ni), iron (Fe), chromium (Cr), zinc (Zn), or tantalum (Ta), and y is in the range of 0.01 to 0.1) or $Li_2Mn_3MO_8$ (where M is Fe, Co, Ni, Cu, or Zn); and $LiMn_2O_4$ having a part of lithium (Li) being substituted with alkaline earth metal ions, but the present specification is not limited thereto.

As the separator, a typical porous polymer film used as a conventional separator, for example, a porous polymer film prepared using a polyolefin-based polymer, such as an ethylene homopolymer, a propylene homopolymer, an ethylene/butene copolymer, an ethylene/hexene copolymer, and an ethylene/methacrylate copolymer, may be used alone or by being laminated. A typical porous nonwoven fabric, for example, a nonwoven fabric formed of high melting point glass fibers or polyethylene terephthalate fibers may be used, but the present specification is not limited thereto.

In an electrolyte used in an embodiment of the present specification, a lithium salt, which may be included as the electrolyte, may be used without limitation as long as it is commonly used in an electrolyte for a secondary battery. An example of an anion of the lithium salt includes one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N-$.

In the electrolyte used in the present specification, an organic solvent included in the electrolyte may be used without limitation as long as it is commonly used, and one or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may be typically used.

Particularly, ethylene carbonate and propylene carbonate, which are ring-type carbonates among the carbonate-based organic solvents, dissociate the lithium salt in the electrolyte well due to high dielectric constants as organic solvents with high viscosity, and thus may be preferably used. An electrolyte having high electrical conductivity may be prepared when the ring-type carbonate is mixed with a linear carbonate having low viscosity and a low dielectric constant, such as dimethyl carbonate and diethyl carbonate, in a suitable ratio, and thus the ring-type carbonate may be more preferably used.

Selectively, the electrolyte stored according to an embodiment of the present specification may further include additives such as an overcharge inhibitor contained in conventional electrolytes.

A separator is disposed between the positive electrode and the negative electrode to form a battery structure, the battery structure is wound or folded to be placed in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

The invention claimed is:

1. A method of preparing a negative electrode active material, comprising:
    forming a carbon coating layer on a silicon-based precursor represented by $SiO_x$ ($0<x<2$) by flowing acetylene gas and argon gas over the silicon-based precursor;
    thermally treating the silicon-based precursor on which the carbon coating layer is formed; and
    preparing a silicon-based composite represented by $SiO_a$ ($0<a<1$) and having a surface on which a carbon coating layer is distributed by removing impurities;
    wherein the silicon-based composite includes an amorphous silicon,
    wherein the thermal treatment includes thermally reducing a silicon-based precursor with a metal reducing agent in an inert atmosphere, and
    wherein the thermal treatment is performed in a temperature range of 350 to 650° C.

2. The method according to claim 1, wherein the silicon-based composite further includes crystalline silicon having a crystal size of 10 nm or less.

3. The method according to claim 1, wherein a content of the carbon coating layer is in a range of 1 to 50 wt % of a total weight of the negative electrode active material.

4. The method according to claim 1, wherein the metal reducing agent includes one selected from the group consisting of Ti, Al, Mg, Ca, Be, Sr, Ba and a combination thereof.

5. The method according to claim 1, wherein a molar ratio of the silicon-based precursor to the metal reducing agent is in a range of 1:0.001 to 1:1.

6. The method according to claim 1, wherein the preparing of the silicon-based composite includes removing impurities using an acidic aqueous solution.

7. The method according to claim 1, wherein the impurities include one or more materials selected from the group consisting of a metal oxide, a metal silicide and a metal silicate, and the metal is one selected from the group consisting of Ti, Al, Mg, Ca, Be, Sr, Ba and a combination thereof.

8. A method of preparing a negative electrode active material, comprising:
    forming a carbon coating layer on a silicon-based precursor represented by $SiO_x$ ($0<x<2$),
    wherein the carbon coating layer is formed by (1) dispersing a carbon precursor in a solvent to form a mixture, adding the mixture to the silicon-based precursor, and performing drying; and (2) performing first thermal treatment of the silicon-based precursor;
    performing second thermal treatment of the silicon-based precursor on which the carbon coating layer is formed; and
    preparing a silicon-based composite represented by $SiO_a$ ($0<a<1$) and having a surface on which a carbon coating layer is distributed by removing impurities;
    wherein the silicon-based composite includes an amorphous silicon,
    wherein the second thermal treatment includes thermally reducing a silicon-based precursor with a metal reducing agent in an inert atmosphere, and
    wherein the second thermal treatment is performed in a temperature range of 350 to 650° C.

* * * * *